United States Patent Office 3,025,134
Patented Mar. 13, 1962

3,025,134
PROCESS FOR PREPARING ALKALI
METAL METABORATES
Gerald J. Dege, Clifton, and James S. MacKenzie, Parsippany, N.J., assignors to Allied Chemical Corporation, New York, N.Y., a corporation of New York
No Drawing. Filed Feb. 24, 1959, Ser. No. 794,811
8 Claims. (Cl. 23—59)

This invention relates to processes for producing alkali metal metaborates, and more particularly relates to the production of sodium metaborate by reacting borax (sodium tetraborate) with sodium carbonate and/or sodium bicarbonate. According to certain aspects of the invention, the metaborates so produced are directly converted to valuable perborates.

Sodium metaborate, for example, is useful in detergents and washing compounds, in the manufacture of glasses and enamels, as a photographic developing agent, etc. Recently it has found substantial use in the manufacture of sodium perborate, a highly effective bleaching agent.

Heretofore, the conventional process for conversion of borax to sodium metaborate has been the reaction of borax with caustic soda (sodium hydroxide). It has also been proposed to combine this reaction with the soda ash (sodium carbonate)—lime (calcium oxide) reaction for the required caustic soda by reacting together borax, soda ash and lime. These processes, however, are not economically attractive.

It has also been known to react borax with sodium carbonate or sodium bicarbonate to obtain sodium metaborate. However, the prior art workers failed to develop a process whereby high yields of the metaborate may be obtained in simple and economical manner.

Accordingly, an object of the present invention is to provide simple and economical processes for the production of alkali metal metaborates, which may then be directly converted to the corresponding perborates.

A more specific object of the invention is to provide simple and economical processes for the production of sodium metaborate by reaction of borax with sodium carbonate and/or sodium bicarbonate, which sodium metaborate may then be directly converted to sodium perborate.

Other objects and advantages of the invention will appear hereinafter.

According to the present invention, alkali metal metaborates are produced by reacting an alkali metal tetraborate with a member of the group consisting of alkali metal carbonates, alkali metal bicarbonates and mixtures thereof in aqueous solution at temperature of at least about 120° C. and under pressure of at least about 30 p.s.i. This reaction forms a solution of alkali metal metaborate from which desired product may be recovered by any suitable procedure.

In attaining the desired results of the present invention, the reaction of the tetraborate with the carbonate and/or bicarbonate must be carried out in aqueous solution at temperature of at least about 120° C., and preferably about 150° to 200° C. Moreover, the reaction must be carried out under pressure of at least about 30 p.s.i., and preferably about 40 to 210 p.s.i. By use of these correlated temperature and pressure operating conditions, yields of metaborate in excess of 75 mol percent may be obtained in simple and efficient manner.

Any of the alkali metal metaborates may be produced in high yield by reacting the appropriate alkali metal salts of tetraborate and carbonate (and/or bicarbonate) under the conditions defined by the present invention. However, the invention is particularly exemplified by the production of sodium metaborate, as set forth below.

The reaction of borax with sodium carbonate to form sodium metaborate in accordance with the present invention may be represented by the following equation:

$$Na_2CO_3 + Na_2B_4O_7 \rightarrow 4NaBO_2 + CO_2\uparrow$$

The formation of sodium metaborate from borax and sodium bicarbonate may be represented by the following equation:

$$2NaHCO_3 + Na_2B_4O_7 \rightarrow 4NaBO_2 + H_2O + 2CO_2\uparrow$$

As indicated above, sodium carbonate, sodium bicarbonate and mixtures thereof are suitable reactants in the processes of this invention. Any commercial forms of these materials, including the various hydrated forms of sodium carbonate, may be employed. With respect to the tetraborate reactant, anhydrous borax or any of its more hydrated forms may be utilized.

Metaborate yields of at least about 75 mol percent are obtained by employing stoichiometric quantities of sodium tetraborate and sodium carbonate (and/or sodium bicarbonate) in the processes of the present invention. Yields approaching theoretical may be obtained by using, in the case of sodium carbonate, about 1.5 to 2 mols per mol of sodium tetraborate and, in the case of sodium bicarbonate, about 3 to 4 mols per mol of sodium tetraborate. Although not generally required, even greater proportions of carbonate and/or bicarbonate may be employed to obtain approximately theoretical yields.

The invention contemplates, in accordance with certain of its aspects, reacting the solution of alkali metal metaborate, without separation of its metaborate content, with hydrogen peroxide under conditions favoring the formation of valuable alkali metal perborate. This operation enables recovery of the metaborate content of the solution in substantially quantitative amount as crystalline alkali metal perborate. After separation of the alkali metal perborate crystals, the resultant mother liquor which contains alkali metal carbonate and/or bicarbonate may be reacted with alkali metal tetraborate under the conditions set forth above to produce additional alkali metal metaborate solution.

Generally speaking, the processes of this invention are carried out by dissolving sodium tetraborate and sodium carbonate (and/or sodium bicarbonate) in water, and then treating the reaction mixture at temperature of at least about 120° C. and under pressure of at least about 30 p.s.i. until evolution of carbon dioxide ceases. The resultant solution is composed principally of sodium metaborate but may also contain varying amounts of sodium bicarbonate, sodium tetraborate and sodium sesquicarbonate. The sodium metaborate may be recovered by any suitable procedure, as by evaporation of the solution or by fractional crystallization.

If desired, the sodium metaborate solution, without recovery of its metaborate content, may be reacted with hydrogen peroxide at a temperature of about 15° to 20° C. to produce crystalline sodium perborate. After separation of the sodium perborate crystals, the resultant mother liquor containing sodium carbonate and/or bicarbonate may be reacted with sodium tetraborate under the conditions of the present invention to produce additional sodium metaborate solution which can then be recycled for reaction with hydrogen peroxide.

This principal of the invention finds valuable application in a process for production of both sodium percarbonate ($2Na_2CO_3 \cdot 3H_2O_2$) and sodium perborate ($NaBO_2 \cdot H_2O_2 \cdot 3H_2O$) as end products. According to this process, sodium percarbonate is formed in a crystallizer from aqueous liquor in which sodium carbonate and hydrogen peroxide charges are reacted. The resulting slurry of sodium percarbonate is centrifuged to yield sodium percarbonate product and mother liquor containing dissolved sodium percarbonate and hydrogen peroxide. The mother liquor from the precarbonate operation is fed as peroxide feed material, together with additional hydrogen peroxide, if necessary, and sodium metaborate solution, to a second crystallizer where the sodium metaborate and hydrogen peroxide react to form a slurry of sodium perborate. This slurry is centrifuged to yield sodium perborate product and mother liquor containing mainly sodium carbonate. The mother liquor from the perborate operation is reacted with borax under the conditions of the present invention, i.e. at temperature of at least about 120° C. and under pressure of at least about 30 p.s.i., to form a solution containing sodium metaborate. This solution is then used as sodium metaborate charge to produce additional sodium perborate.

The following examples are illustrative of the present invention. Parts are by weight except where otherwise indicated.

*Example 1*

44.1 parts of sodium bicarbonate and 52.8 parts of anhydrous borax in 1000 parts of distilled water were charged to a stainless steel reactor provided with a pressure release valve. The valve was set for pressure of about 155 p.s.i., and heat was applied to the system. After about 90 minutes a constant temperature of about 175° C. was attained. Reaction was continued for about 2 hours until evolution of carbon dioxide ceased. The reaction product was then removed and cooled to room temperature. Analysis of the product showed a 76 mol percent yield of sodium metaborate.

*Example 2*

41.8 parts of sodium carbonate and 52.8 parts of anhydrous borax in 1000 parts of distilled water were charged to the reactor employed in Example 1. The reaction mixture was heated at about 155° C. and under pressure of about 95 p.s.i. for about 2 hours. The reaction product was then removed and cooled to room temperature. Analysis of the product showed about a 100 mol percent yield of sodium metaborate.

*Example 3*

The product obtained in Example 2 was combined with several similar products and treated with a small quantity of magnesium chloride hexahydrate to remove iron impurities. The resulting solution containing 169.2 grams per liter sodium metaborate and 55 grams per liter sodium bicarbonate was employed to prepare sodium perborate by reaction with sodium percarbonate and hydrogen peroxide.

A slurry of 70 grams of sodium perborate in about 500 cc. of distilled water was charged at a temperature of about 20° C. to a glass reactor provided with mechanical agitation. To this slurry, 780 cc. of the above sodium metaborate solution, 800 cc. of a solution containing 78.7 grams sodium percarbonate (15.06% active oxygen) and 42.7 grams hydrogen peroxide were added over a period of 1¼ hours. The temperature of the percarbonate-peroxide solution was kept below 5° C. to prevent undue loss of active oxygen. To stabilize the sodium perborate product, magnesium silicate stabilizer was added during the reaction (about 0.5% based on sodium perborate). When addition of the reactants was completed, the reactor slurry was stirred for an additional 3¼ hours, maintaining the reaction temperature at about 20° C. The slurry was then fed to a centrifuge, yielding 333 grams of wet sodium perborate of 10.12% active oxygen content. After vacuum drying at about 25° C. (2–5 mm. Hg), 317 grams of highly stable, crystalline sodium perborate having an active oxygen content of 10.4% were obtained. The yield of dry sodium perborate (allowing for the addition of the 70 grams of heel) was about 80% Upon chilling the filtrate from the centrifuge to 5° C., additional sodium perborate crystals may be recovered to make the over-all yield of sodium perborate about 93%. Moreover, the filtrate contained considerable dissolved sodium carbonate which may be reacted with borax under the conditions of the present invention to produce additional sodium metaborate charge.

While the particular processes herein described are well adapted to carry out the objects of the present invention, the invention is not limited to the particular processes but includes all such modifications and changes as come within the scope of the appended claims.

We claim:

1. A process for preparing alkali metal metaborates which comprises reacting an alkali metal tetraborate with a member of the group consisting of alkali metal carbonates, alkali metal bicarbonates and mixtures thereof in aqueous solution at temperature of about 120° to 200° C. and under pressure of about 30 to 210 p.s.i. until evolution of carbon dioxide ceases, thereby forming an alkali metal metaborate as product in yield of at least about 75 mol percent.

2. A process for preparing alkali metal metaborates which comprises reacting an alkali metal tetraborate with a member of the group consisting of alkali metal carbonates, alkali metal bicarbonates and mixtures thereof in aqueous solution at temperature of about 150° to 200° C. and under pressure of about 40 to 210 p.s.i. until evolution of carbon dioxide ceases, thereby forming an alkali metal metaborate as product in yield of at least about 75 mol percent.

3. A process for preparing sodium metaborate which comprises reacting sodium tetraborate with a member of the group consisting of sodium carbonate, sodium bicarbonate and mixtures thereof in aqueous solution at temperature of about 120° to 200° C. and under pressure of about 30 to 210 p.s.i. until evolution of carbon dioxide ceases, thereby forming sodium metaborate as product in yield of at least about 75 mol percent.

4. A process for preparing sodium metaborate which comprises reacting sodium tetraborate with a member of the group consisting of sodium carbonate, sodium bicarbonate and mixtures thereof in aqueous solution at temperature of about 150° to 200° C. and under pressure of about 40 to 210 p.s.i. until evolution of carbon dioxide ceases, thereby forming sodium metaborate as product in yield of at least about 75 mol percent.

5. A process for preparing sodium metaborate which comprises reacting sodium tetraborate with sodium carbonate, in ratio of at least about 1 mol of sodium carbonate per mol of sodium tetraborate, in aqueous solution at temperature of about 150° to 200° C. and under pressure of about 40 to 210 p.s.i. until evolution of carbon dioxide ceases, thereby forming sodium metaborate as product in yield of at least about 75 mol percent.

6. A process for preparing sodium metaborate which comprises reacting sodium tetraborate with sodium carbonate, in ratio of about 1.5 to 2 mols of sodium carbonate per mol of sodium tetraborate, in aqueous solution at temperature of about 150° to 200° C. and under pressure of about 40 to 210 p.s.i. until evolution of carbon dioxide ceases, thereby forming sodium metaborate as product in yield of at least about 75 mol percent.

7. A process for preparing sodium metaborate which comprises reacting sodium tetraborate with sodium bicarbonate, in ratio of at least about 2 mols of sodium bicarbonate per mol of sodium tetraborate, in aqueous solution at temperature of about 150° to 200° C. and under pressure of about 40 to 210 p.s.i. until evolution of carbon dioxide ceases, thereby forming sodium metaborate as product in yield of at least about 75 mol percent.

8. A process for preparing sodium metaborate which comprises reacting sodium tetraborate with sodium bicarbonate, in ratio of about 3 to 4 mols of sodium bicarbonate per mol of sodium tetraborate, in aqueous solution at temperature of about 150° to 200° C. and under pressure of about 40 to 210 p.s.i. until evolution of carbon dioxide ceases, thereby forming sodium metaborate as product in yield of at least about 75 mol percent.

References Cited in the file of this patent

UNITED STATES PATENTS

| | | |
|---|---|---|
| 1,492,920 | Knight et al. | May 6, 1924 |
| 1,847,836 | Kelly | Mar. 1, 1932 |
| 2,105,109 | Dolley | Jan. 11, 1938 |
| 2,146,093 | Ritchie et al. | Feb. 7, 1939 |

FOREIGN PATENTS

| | | |
|---|---|---|
| 211,626 | Australia | Oct. 24, 1957 |

OTHER REFERENCES

Jacobson: Encyclopedia of Chemical Reactions, vol. 1 (1946), Reinhold Publ. Corp., page 697.

McPherson and Henderson book on "General Chemistry," third ed., 1927, pages 304–309, 518, Ginn and Co., N.Y.